INVENTORS,
Hampton G. Corneil
Everett W. Lewis,
Harry G. Boynton,
Albert T. Watson, BY Carl G. Ries

ATTORNEY.

INVENTORS,
Hampton G. Corneil,
Everett W. Lewis,
Harry G. Boynton,
Albert T. Watson,
BY Carl G. Ries
ATTORNEY.

United States Patent Office 2,807,640
Patented Sept. 24, 1957

2,807,640
PROCESS FOR PREPARING A HEAT-STABLE, OIL-SOLUBLE BASIC ORGANIC SULFONATE

Harry G. Boynton, Hampton G. Corneil, Everett W. Lewis, and Albert T. Watson, Baytown, Tex., assignors, by mesne assignments, to Esso Research and Engineering Company, Elizabeth, N. J., a corporation of Delaware Application May 31, 1955, Serial No. 511,951

10 Claims. (Cl. 260—504)

The present invention relates to heat-stable, oil-soluble organic calcium sulfonates. More particularly, this invention relates to a method for converting an organic chloride contaminated photochemical organic sulfonyl chloride product into an oil-soluble, heat-stable calcium sulfonate product.

Basic oil-soluble organic calcium sulfonates, hereinafter referred to generally as sulfonates, may be prepared by first photochemically reacting sulfur dioxide and chlorine with an organic feed stock to form a sulfonyl chloride derivative thereof and then saponifying the sulfonyl chloride derivative with a freshly prepared aqueous slurry of unslaked lime. Basic organic sulfonates of this nature are useful as detergent oil additives, particularly when in dilute solution in a suitable organic diluent such as a paraffinic hydrocarbon or a higher boiling lubricating oil fraction (e. g. a lubricating oil fraction having a viscosity SSU at 100° F. of about 100). However, basic organic sulfonates of this nature tend to be unstable at the high temperatures encountered in internal combustion engines. It is postulated that the unstability of such sulfonates is largely attributable to the presence of organic chloride contaminants formed in the photochemical reaction step.

Accordingly, an object of the present invention is the provision of heat-stable, oil-soluble basic organic sulfonates.

Another object is the provision of a process for preparing heat-stable, oil-soluble basic organic sulfonates.

A further object is the provision of a process for hydrolyzing unstable organic chloride impurities contained in an oil-soluble basic organic sulfonate without impairing the basicity of the organic sulfonate product.

These and other objects are attained by saponifying a photochemical organic sulfonyl chloride product containing organic chloride impurities with a freshly prepared aqueous slurry of calcium oxide at a temperature of about 125° to 250° F. to form a basic organic calcium sulfonate product and then hydrolyzing the organic chloride impurities in said product at a temperature of about 275° to 550° F. with a sulfonate-stabilizing aqueous slurry of unslaked lime (calcium oxide). It is to be noted that a slurry of calcium oxide (e. g. unslaked lime) in water is to be used in treating the photochemical product. While some of the calcium oxide in the slurry is hydrolyzed to calcium hydroxide in the presence of water, it has been found that commercially available dry-hydrated lime does not give satisfactory results if employed for the saponification and hydrolysis reactions of the present invention and that the calcium hydroxide must be formed in situ by slurrying calcium oxide with water.

The photochemical feed stock may be a paraffinic or naphthenic hydrocarbon (preferably one having an average molecular weight of about 300 to 550) such as a hydrocarbon feed stock in the lubricating oil boiling range or higher, a so-called white oil of commerce, a paraffin wax, a raffinate of a lubricating oil fraction, waxes derived from the dewaxing of light motor oils, etc. The hydrocarbon is photochemically reacted with sulfur dioxide and chlorine at a temperature of about 60° to 200° F. for a time of exposure of about 5 to 360 minutes. Saponification of the sulfonyl chloride product produced by the photochemical reaction is conducted with a freshly prepared aqueous slurry of unslaked lime having a mole ratio of water to lime (calcium oxide) in the range of about 10:1 to 100:1 (preferably in the range of about 40:1 to 60:1) to give a basic sulfonate product. The saponification reaction is conducted at a temperature of about 125° to 250° F. with a contact time of about 5 to 180 minutes. For best results it is preferable to use a temperature of about 170° to 220° F. The amount of lime (calcium oxide) to be used should be about 1.25 to 3 times the theoretical amount of calcium oxide required to saponify the organic sulfonyl chloride product.

It has been discovered in accordance with the present invention that the heat stability of the thus-prepared sulfonate product, after saponification, is greatly improved by heating the same at a temperature of about 275° to 550° F. with agitation in the presence of an excess of a sulfonate stabilizing lime slurry to hydrolyze organic chloride impurities. It is to be emphasized that the photochemical sulfonyl chloride product should be substantially completely saponified prior to the hydrolysis step, for organic sulfonyl chlorides are unstable at the temperatures required for successful hydrolysis.

Not all aqueous lime slurries may be used in practicing the process of the present invention, for operable results are obtained only when the aqueous calcium oxide slurry used in the hydrolysis step has sulfonate stabilizing properties. Thus, it has been discovered that if an aqueous calcium oxide slurry which has been maintained at a temperature of about 125° to 250° F. for more than about 15 minutes is used during the hydrolysis step, the basicity of the organic sulfonate product is adversely affected. Accordingly, a "sulfonate stabilizing aqueous calcium hydroxide slurry" of the type to be used for the hydrolysis step may be defined as consisting of an aqueous lime slurry maintained at a temperature of about 170–250° F. for less than about 15 minutes, or an admixture of a slurry maintained at a temperature of about 170°–250° F. for more than 15 minutes with a stabilizing amount of a slurry maintained at a temperature of about 170°–250° F. for less than 15 minutes.

The organic sulfonates to be stabilized in accordance with the present invention are preferably the basic organic sulfonates. The basic and neutral sulfonates are prepared by saponifying a photochemical organic sulfonyl chloride product in the presence of an excess of a freshly prepared aqueous lime slurry comprising about 10–100 mols of water per mol of lime. The amount of slurry to be used should preferably be such that there is present about 1–2.5 mols of lime per mol of organic sulfonyl chloride and in addition, about 0.2–0.7 mols of lime per mol of organically bound chlorine impurities. It is preferable to use about 1.5 mols of lime per mol of photochemical sulfonyl chloride product.

The aqueous lime slurry may be added to the photochemical product by batchwise, continuous or incremental addition, provided only that the amount of slurry added to the photochemical sulfonyl chloride product at a temperature of about 170°–250° F. is sufficient to completely saponify the organic sulfonyl chloride and that the lime slurry used during the hydrolysis step have sulfonate-stabilizing properties. In general, it is preferable to conduct the saponification and hydrolysis steps over a total period of about 30–240 minutes.

In the situation wherein continuous or incremental addition of the lime slurry is practiced, it is generally preferable that at least about 20 weight percent or more of the total amount of slurry to be used be added as a sulfonate-stabilizing slurry subsequent to the saponification step. In this situation, it is generally desirable to add a lime slurry which has been prepared just prior to use, although an "older" lime slurry maintained at a temperature of less than about 250° F. for less than 15 minutes may also be used. If an "older" lime slurry is used, however, a greater amount should be added, the amount to be added in this situation being such that effective stabilization of the organic sulfonate product is obtained. The amount to be used can be readily determined by measuring the basicity of the oil phase of the reaction mixture prior to and subsequent to the addition of the "older" lime slurry. A decline in basicity will occur if an insufficient amount of the "older" slurry has been added. Conversely, the basicity will remain substantially constant or increase if a sufficient quantity of the "older" slurry has been added. In general, it is preferable to add the sulfonate-stabilizing slurry in an amount sufficient to increase the basicity of the oil phase of the reaction mixture.

The photochemical sulfonyl chloride product may be diluted prior to, during or subsequent to the saponification and hydrolysis steps in order to form a diluted product having the desired concentration of basic sulfonate (e. g. a 20% to 50% concentration). As a general rule, the photochemical sulfonyl chloride product is relatively viscous and it is, therefore, generally preferable to dilute the photochemical product prior to the saponification and hydrolysis thereof.

The reaction mixture formed during the saponification and hydrolysis reactions will generally be in the form of an aqueous emulsion. The stabilized basic organic sulfonate product and diluent, if any, may be recovered from the aqueous emulsion by any suitable means. For example, the emulsion may be broken by adding a suitable amount of an emulsion-breaking agent such as a solvent naphtha thereto, and the aqueous and oil phases may then be separated by any suitable means such as settling. The stabilized basic organic sulfonate can be separated from the emulsion-breaking agent by any suitable means such as fractional distillation, selective adsorption, etc. and such residual solids as may be present in the oil phase may be separated therefrom by any suitable means such as filtration, centrifugation, etc.

The present invention will be further illustrated by reference to the accompanying drawings in which.

Figure 1:
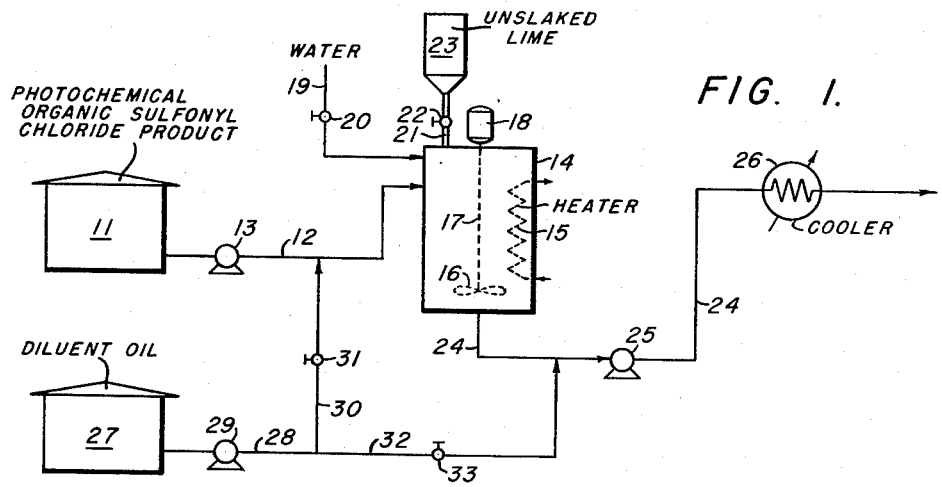
Fig. 1 is a flow diagram illustrating one manner in which the process of the present invention may be practiced.

Turning now to Fig. 1, the numeral 11 designates a storage tank containing a photochemical organic sulfonyl chloride product derived from a photochemical reaction (not shown). An inlet line 12 containing a pump 13 leads from the storage tank 11 to a suitable treating zone 14 equipped with a heater 15 and an agitator 16. The agitator 16 may be activated through a shaft 17 connected with a prime mover 18, such as an electric motor. A line 19 containing a valve 20 is connected with a suitable water supply source (not shown) and a line 21 containing a valve 22 is connected with an unslaked lime storage bin 23. A discharge line 24 from the treating zone 14 containing a pump 25 leads to a suitable cooler 26 and from thence to a recovery zone (not shown). There is also provided a storage tank 27 containing a diluent oil. A line 28 containing a pump 29 leads from the storage tank 27 and is provided with a branch line 30 containing a valve 31 which connects with the inlet line 12 and a branch line 32 containing a valve 33 which connects with the discharge line 24.

In conducting operations, a suitable amount of water is introduced into the treating zone 14 through the line 19 by opening valve 20 and a suitable quantity of unslaked lime is delivered to the treating zone 14 from the bin 23 through line 21 by opening valve 22, the mixture being agitated to form an aqueous lime slurry. The valves 20 and 22 are closed when the desired amounts of water and lime have been added and photo-chemical organic sulfonyl chloride product is then charged to the treating zone 14 through the line 12. The reaction mixture is heated at a temperature of about 125° to 250° F. for less than about 15 minutes, but for a time sufficient to saponify the organic sulfonyl chloride product by means of the heater 15, whereby the basic organic sulfonate is formed. The heater 15 is then activated to increase the temperature of the reaction mixture to about 275° to 550° F. in order to hydrolyze organic chloride impurities in the organic sulfonate product. The slurry may be maintained at the higher temperatures for a period of about one hour or more or until the product has attained a substantially constant chlorine value. At the end of the hydrolysis step, the product is discharged through line 24, passed through the cooler 26 and thence to a suitable separation zone (not shown) where the heat-stable organic sulfonate product is recovered.

It is sometimes desirable to dilute the photochemical product with a suitable organic diluent. Thus, if the original photochemical organic sulfonyl chloride product is excessively viscous, it may be admixed with a diluent oil from the storage tank 27 prior to saponification and hydrolysis steps. This is accomplished by closing valve 33 and opening valve 31 so that diluent oil may be forced by the pump 29 through the line 28 and the branch line 30 into the line 12. If, on the other hand, the initial photochemical organic sulfonyl chloride product is sufficiently fluent, the valve 31 may be closed and the valve 33 may be opened so that the diluent oil may be charged by the line 28 and branch line 32 to the discharge line 24, this being done in order to provide a diluted heat-stable organic sulfonate product containing the desired quantity of organic sulfonate for use as a detergent and lubricating oil additive. If a diluent oil is not to be added both of the valves 31 and 33 are closed.

Figure 2:
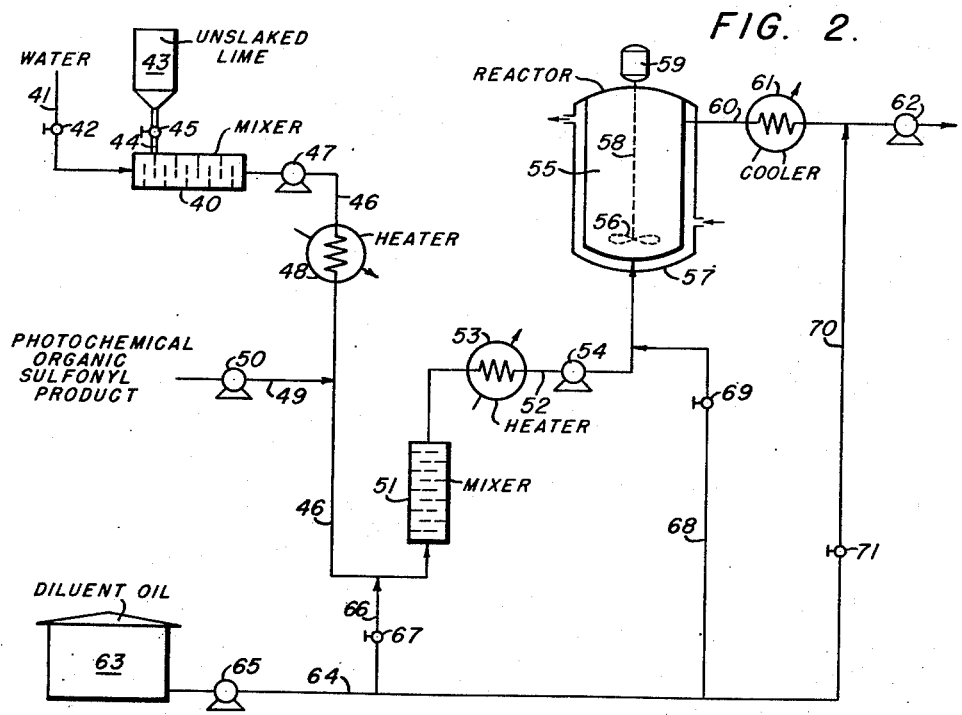
Fig. 2 is a flow diagram illustrating a modified procedure that may be followed in conducting the process of the present invention.

A modified procedure may be used if the initial photochemical organic sulfonyl chloride product is to be charged to the saponification and hydrolysis zones directly from the photochemical reactor at a temperature of about 125° to 250° F., as is shown in Fig. 2. In this showing, water from a suitable source is passed to a mixing device 40 by means of a line 41 containing a valve 42 and unslaked lime is charged to the mixing device 40 from a bin 43 by means of a line 44 containing a valve 45. From the mixing device 40 the thus prepared aqueous slurry flows through a line 46 containing a pump 47 and a heater 48 for bringing the slurry to the temperature of the organic sulfonyl chloride product. The heated slurry discharges into line 46. The organic sulfonyl product formed in a photochemical reactor (not shown) is also introduced into line 46 by means of line 49 containing pump 50. The organic sulfonyl product at the time of admixture with the slurry is at a temperature of about 125° to 250° F. The resultant mixture flows through the line 46 to a suitable short contact time mixer 51, such as an orifice plate incorporator, in which mixer saponification of the sulfonyl chloride product occurs within a period less than 15 minutes. The saponified product passes from the mixer 51 through a line 52 containing a heater 53 and a pump 54 where it is heated to a temperature of about 275° to 550° F. The line 52 discharges into a suitable holding vessel 55 such as a jacketed autoclave provided with an agitator 56, which holding vessel is maintained at a temperature of about 275° to 550° F. by passing a suitable heating medium through the jacket 57. The agitator 56 may be motivated by a shaft 58 connected with a prime mover 59 such as an electric motor. Hydrolysis of the organic chloride impurities contained in the saponified organic sulfonate product will occur in the holding vessel 55, the residence time of the reaction mixture in the holding vessel 55 being sufficient to serve this purpose. From the holding vessel 55, the saponified hydrolysis product is discharged through a line 60 containing a suitable cooler 61 and a pump 62, the line 60 leading to a suitable recovery zone (not shown) where the basic organic sulfonate product is recovered. If desired, a diluent oil contained in the storage tank 63 may be admixed with the photochemical product prior to, after, or intermediate the saponification and hydrolysis steps. This is accomplished through the provision of a line 64 containing a pump 65 and leading to a branch line 66 containing a valve 67, a branch line 68 containing a valve 69, and a branch line 70 containing a valve 71. If the diluent oil is to be added prior to saponification, the valves 69 and 71 are closed and the valve 67 is opened so that the diluent oil will be forced by the pump 65 through line 64 and branch line 66 into line 46. If the diluent oil is to be added subsequent to hydrolysis, the valves 67 and 71 are closed and the valve 69 is opened so that the diluent oil will be forced by the pump 65 through the line 64 and the branch line 68 into the discharge line 52. In a similar manner, the valves 67 and 69 may be closed and the valve 71 opened so that the diluent oil will be forced by the pump 65 through the line 64 and the branch line 70 into the line 60. If desired, the diluent oil may be simultaneously discharged through any two or all of the branch lines 66, 68 and 70.

Figure 3:
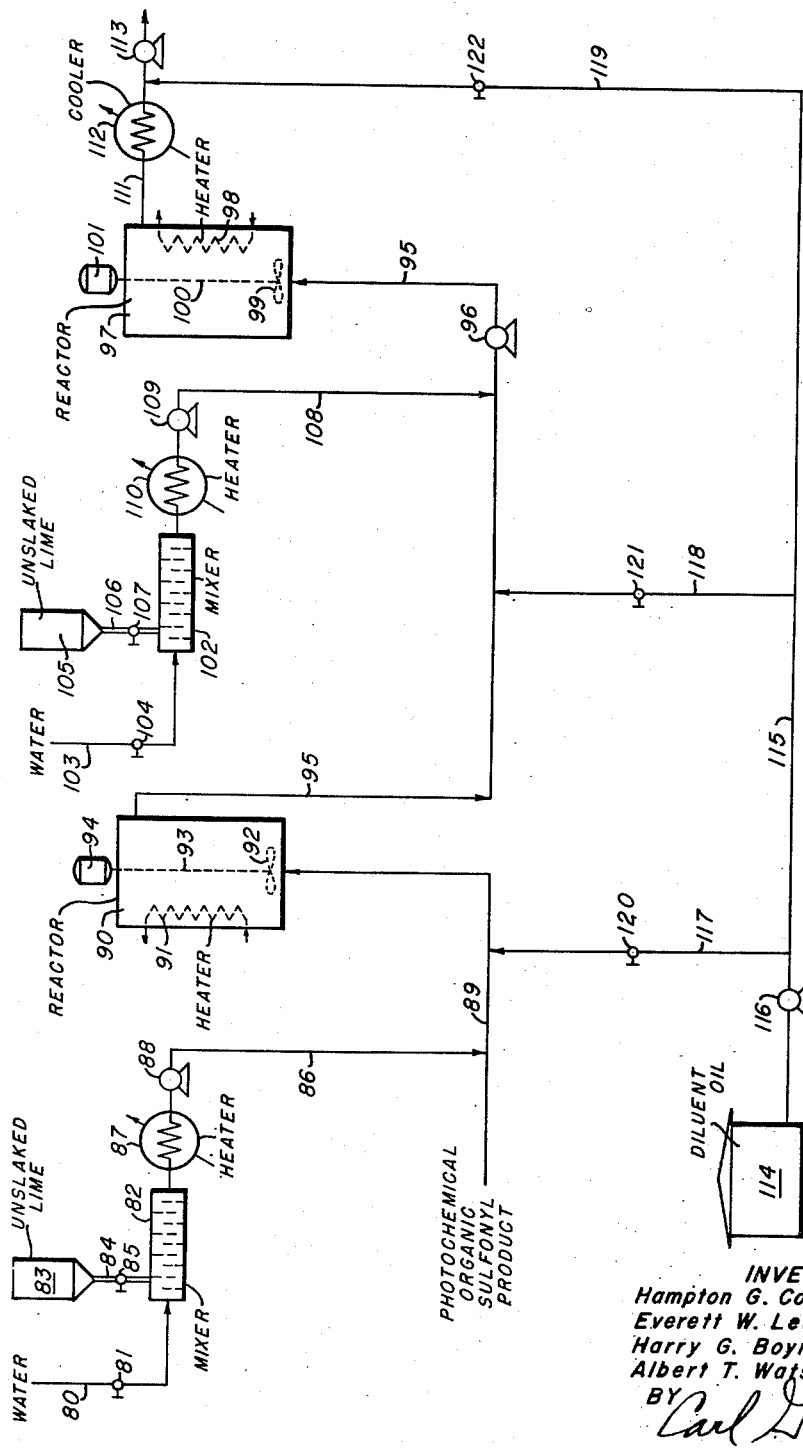
Fig. 3 is a flow diagram illustrating a still further modification of the process of the present invention.

A still further modification of the process of the present invention is shown in Fig. 3. In accordance with this modification, a lime slurry is prepared by supplying water from a line 80 containing a valve 81 to a suitable mixing device 82 and unslaked lime is added to the mixing device 82 from a bin 83 by means of a line 84 containing a valve 85. From the mixing device 82 the slurry flows through a discharge line 86 containing a heater 87 and a pump 88, the line 86 flowing into a line 89 from a photochemical reactor (not shown). The line 89 contains a photochemical sulfonyl chloride product at a temperature of about 125° to 250° F. The mixture of photochemical product and lime slurry flows through the line 89 into a first treating zone 90 provided with a heater 91 and an agitator 92. The agitator 92 may be activated by means of a shaft 93 connected with a suitable prime mover 94 such as an electric motor. In the first treating zone 90, the mixture of photochemical product and lime slurry is maintained at a temperature of about 125° to 250° F. for a period in excess of 15 minutes (e. g. about 60 minutes) to form a highly basic organic sulfonate product. At the end of this time, the saponified material is discharged through a line 95 containing a pump 96 to a second treating zone 97 containing a suitable heating element 98 and an agitator 99. The agitator 99 may be activated by means of a shaft 100 connected with a suitable prime mover 101, such as an electric motor. In accordance with this modification, a second lime slurry is prepared in a suitable mixing device 102 by charging water thereto through a line 103 controlled by a valve 104 and by charging unslaked lime thereto from a bin 105 by means of a line 106 controlled by a valve 107. The slurry is discharged from the mixing device 102 through a line 108 containing a pump 109 and a heater 110 into the line 95. The amount of lime slurry to be added through the line 108 should be sufficient to impart stability to the organic sulfonates contained in the second treating zone 97. In the second treating zone 97, the reaction mixture is heated at a temperature of about 275° to 550° F. by the heating element 98 and is maintained at this temperature for a period of time sufficient to attain the desired hydrolysis of organic chloride impurities. From the treating zone 97 the thus hydrolyzed product flows through a discharge line 111 containing a suitable cooler 112 and a pump 113 to a separation zone (not shown) where the stabilized organic sulfonate product is recovered. If desired, a diluent oil from a tank 114 may be discharged by means of line 115 containing a pump 116 into branch lines 117, 118, and 119 containing valves 120, 121, and 122, respectively, in order to provide for dilution of the photochemical product at any desired point in the treating process. Thus the valves 121 and 122 may be closed so that the diluent discharged to the line 89 through branch line 117, the valves 120 and 122 may be closed and the valve 121 opened so that diluent may be charged to the line 95 through branch line 118 or the valves 120 and 121 may be closed and the valve 122 opened to charge diluent oil to the line 111 through branch line 119. If desired, the diluent oil may be simultaneously added at two or more points through suitable manipulation of the valves 120, 121, and 122.

The process of the present invention will be further illustrated by a series of runs in which a hydrocarbon feed stock was sulfo-chlorinated by exposure of the feed stock to light in the presence of sulfur dioxide and chlorine in order to form organic sulfonyl chloride products which were then saponified and hydrolyzed. In this situation, the photochemical products were diluted with a diluent oil to provide a 30% concentration of sulfonyl chlorides. The conditions employed and the results obtained are set forth in Table I. The initial charge stock from which the sulfonyl chloride product was derived was a phenol-extracted Coastal distillate having a viscosity of 500 S. S. U. at 100° F. and 60 S. S. U. at 210° F.

Table I

|  | A | B | C |
|---|---|---|---|
| Sulfonyl chloride product characteristics: |  |  |  |
| Sulfonyl chloride content, wt. percent | 40.1 | 42.3 | 42.3 |
| Chlorine as organic chlorine, wt. percent | 10.7 | 10.3 | 10.3 |
| Composition of 30% concentrate: |  |  |  |
| Sulfonyl chloride product, wt. percent | 74.6 | 68.6 | 68.6 |
| Diluent oil,[1] wt. percent | 25.4 | 31.4 | 31.4 |
| Total | 100.0 | 100.0 | 100.0 |
| Quality of 30% concentrate: |  |  |  |
| Sulfonyl chloride, wt. percent | 29.9 | 29.0 | 29.0 |
| Chlorine as organic chlorine, wt. percent | 8.0 | 7.1 | 7.1 |
| Blend charged to first (neutralization) step: |  |  |  |
| 30% concentrate, wt. percent | 47.3 | 47.3 | 54.7 |
| Lime, wt. percent | 5.3 | 5.0 | 4.3 |
| Water, wt. percent | 47.4 | 47.7 | 41.0 |
| Total | 100.0 | 100.0 | 100.0 |
| Water, vols./vol. of 30% concentrate | 1.0 | 1.0 | 0.74 |
| Lime, lbs./gal. of 30% concentrate | 0.93 | 0.86 | 0.64 |
| Blend charged to second (hydrolysis) step: |  |  |  |
| Total product from first step, wt. percent | 100.0 | 100.0 | 86.5 |
| Additional lime, wt. percent | 0 | 0 | 1.3 |
| Additional water, wt. percent | 0 | 0 | 12.2 |
| Total | 100.0 | 100.0 | 100.0 |
| Additional water, vols./vol. of 30% concentrate | 0 | 0 | 0.26 |
| Additional lime, lbs./gal. of 30% concentrate | 0 | 0 | 0.22 |
| Total water charged, vols./vol. of 30% concentrate | 1.0 | 1.0 | 1.0 |
| Total lime charged, lbs./gal. of 30% concentrate | 0.93 | 0.86 | 0.86 |
| Total lime charged, percent of theoretical [2] | 130 | 130 | 130 |
| Conditions used for first step: |  |  |  |
| Minutes at 180° F | 60 | <15 | 60 |
| Pressure, p. s. i. g | 0 | 0 | 0 |
| Quality of intermediate product: |  |  |  |
| Alkaline neut. number [3] | 27.4 | -------- | 9.25 |
| Chlorine, wt. percent | 7.85 | -------- | 5.9 |
| Conditions used for second step: |  |  |  |
| Minutes at 350° F | 120 | 120 | 120 |
| Pressure, p. s. i. g | 150 | 150 | 150 |
| Quality of finished product: |  |  |  |
| Alkaline neut. number [3] | 8.6 | 13 | 15 |
| Chlorine, wt. percent | 4.7 | 2.9 | 2.8 |

[1] A phenol extracted Coastal distillate having a viscosity of 100 SSU at 100° F. and 40 SSU at 210° F.
[2] Theoretical amount of lime required to convert all the sulfonyl chlorides to basic calcium sulfonates and to hydrolyze the organic chlorides to a chlorine concentration of 3.0 wt. percent.
[3] An arbitrary numerical measure of basicity representing the number of milligrams of KOH per gram of unsulfonated oil required to form a basic product having the same basicity as the oil being tested.

It will be noted from Table I that the saponified product A initially had a neutralization number of 27.4 and a weight percent of chlorine of 7.85 and that the alkalinity (i. e. basicity) of this product was adversely affected during the hydrolysis step so that the final product had a neutralization number of only 8.6. By way of contrast, the product of column C had a neutralization number of only 9.25 at the end of the saponification step, whereas the final product had a neutralization number of about 15. It is further to be noted that the final products of columns B and C contained only about one-half as much chlorine as the product of column A. 30% concentrates of basic organic sulfonates are heat stable when they contain not more than about 3 weight percent of chlorine. It is seen from this that the product of column A is not heat stable whereas the products of columns B and C have heat stability.

What is claimed is:

1. A process for heat-stabilizing a chloride-contaminated oil-soluble, basic, photochemically produced organic sulfonated material which comprises treating said material at a temperature of about 275 to 550° F. with a sulfonate-stabilizing aqueous calcium oxide slurry to hydrolyze the organic chloride contaminants contained therein, the organic groups of said sulfonate material being saturated hydrocarbon groups having a molecular weight within the range of about 300 to about 550, said slurry being selected from the group consisting of fresh aqueous calcium oxide slurries maintained at a temperature of about 170° to about 250° F. for less than about 15 minutes and mixtures of calcium oxide slurries maintained at a temperature of about 170° to about 250° F. for more than about 15 minutes with stabilizing amounts of said fresh calcium oxide slurries.

2. A process for preparing a heat-stable, oil-soluble, basic organic sulfonate material from a chloride-contaminated, photochemically produced organic sulfonyl chloride product which comprises the steps of saponifying the organic sulfonyl chloride product with a freshly prepared aqueous slurry of calcium oxide at a temperature of 150° to 250° F. and then hydrolyzing saponified product at a temperature of about 275° to 550° F. with a sulfonate-stabilizing aqueous calcium oxide slurry, the organic groups of said sulfonate material being saturated hydrocarbon groups having a molecular weight within the range of about 300 to about 550, said slurry being selected from the group consisting of fresh aqueous calcium oxide slurries maintained at a temperature of about 170° to about 250° F. for less than about 15 minutes and mixtures of calcium oxide slurries maintained at a temperature of about 170° to about 250° F. for more than about 15 minutes with stabilizing amounts of said fresh calcium oxide slurries.

3. A process for preparing a heat-stable, oil-soluble, basic organic sulfonate material from a chloride-contaminated, photochemically produced organic sulfonyl chloride product which comprises the steps of saponifying the organic sulfonyl chloride product with a freshly prepared aqueous slurry of calcium oxide at a temperature of 150° to 250° F., said saponification being completed within about a 15-minute period and immediately thereafter heating the saponified product at a temperature of about 275° to 550° F. to hydrolyze the chloride impurities contained therein, the organic groups of said sulfonate material being saturated hydrocarbon groups having a molecular weight within the range of about 300 to about 550, said slurry being selected from the group consisting of fresh aqueous calcium oxide slurries maintained at a temperature of about 170° to about 250° F. for less than about 15 minutes and mixtures of calcium oxide slurries maintained at a temperature of about 170° to about 250° F. for more than about 15 minutes with stabilizing amounts of said fresh calcium oxide slurries.

4. A process for preparing a heat-stable, oil-soluble, basic organic sulfonate material from a chloride-contaminated, photochemically produced organic sulfonyl chloride product which comprises the steps of saponifying the organic sulfonyl chloride product with a freshly prepared aqueous slurry of calcium oxide at a temperature of 150° to 250° F., said saponification step being completed within a period of about 15 to 300 minutes, thereafter adding to the saponified product a stabilizing amount of sulfonate-stabilizing aqueous calcium oxide slurry and heating the resultant mixture at a temperature of about 275° to 550° F. to hydrolyze the chloride impurities cotnained therein, the organic groups of said sulfonate material being saturated hydrocarbon groups having a molecular weight within the range of about 300 to about 550, said slurry being selected from the group consisting of fresh aqueous calcium oxide slurries maintained at a temperature of about 170° to about 250° F. for less than about 15 minutes and mixtures of calcium oxide slurries maintained at a temperature of about 170° to about 250° F. for more than about 15 minutes with stabilizing amounts of said fresh calcium oxide slurries.

5. A process for preparing a heat-stable, oil-soluble, basic organic sulfonate material from a chloride-contaminated, photochemically produced, concentrated organic sulfonyl chloride product which comprises the steps of diluting said concentrated photochemical product with an amount of a compatible organic diluent sufficient to provide a charge stock containing about 20–50 weight percent of organic sulfonyl chlorides, saponifying said charge stock at a temperature of about 150°–250° F. with a freshly prepared aqueous calcium oxide slurry containing about 10–100 parts of water per part of calcium oxide and then hydrolyzing the saponified product at a temperature of about 275° to 550° F. with a sulfonate-stabilizing aqueous calcium oxide slurry, the organic groups of said sulfonate material being saturated hydrocarbon groups having a molecular weight within the range of about 300 to about 550, said slurry being selected from the group consisting of fresh aqueous calcium oxide slurries maintained at a temperature of about 170° to about 250° F. for less than about 15 minutes and mixtures of calcium oxide slurries maintained at a temperature of about 170° to about 250° F. for more than about 15 minutes with stabilizing amounts of said fresh calcium oxide slurries.

6. A process as in claim 5 wherein the aqueous calcium oxide slurry contains about 50–60 mols of water per mol of calcium oxide.

7. A process as in claim 6 wherein the charge stock is saponified at a temperature of about 170° to 220° F. and hydrolyzed at a temperature of about 340° to 375° F.

8. A process as in claim 5 wherein the aqueous calcium oxide slurry used to saponify the charge stock is used to hydrolyze the same without dilution, the saponification step being completed within less than about a 15 minute period and the hydrolysis step being performed immediately after the saponification step.

9. A process as in claim 5 wherein the saponification step is performed over about a 15–240 minute period and wherein, just prior to the hydrolysis step, there is added to the saponified reaction mixture at least about 20 weight percent, based on the amount of calcium oxide originally present, of a freshly aqueous calcium oxide slurry containing about 10–100 mols of water per mol of calcium oxide.

10. A process as in claim 9 wherein the freshly prepared aqueous calcium oxide slurry added prior to the saponification step contains about 40–60 mols of water per mol of calcium oxide.

References Cited in the file of this patent

UNITED STATES PATENTS

| | | |
|---|---|---|
| 2,174,507 | Tinker et al. | Sept. 26, 1939 |
| 2,434,746 | Ross et al. | Jan. 20, 1948 |